(12) United States Patent
Suzuki (10) Patent No.: US 6,280,036 B1
(45) Date of Patent: *Aug. 28, 2001

(54) PROJECTION APPARATUS

(75) Inventor: Kazunori Suzuki, Yokohama (JP)

(73) Assignee: Canon Kabushiki Kaisha, Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,823

(22) Filed: Dec. 4, 1998

(30) Foreign Application Priority Data

Dec. 5, 1997 (JP) .................................... 9-350248

(51) Int. Cl.⁷ .................................... G03B 21/00
(52) U.S. Cl. .................................... 353/31
(58) Field of Search .................... 353/52, 57, 58, 353/60, 61, 78, 77, 76, 75, 74, 99, 119, 31; 349/161, 5

(56) References Cited

U.S. PATENT DOCUMENTS

| | | |
|---|---|---|
| 4,613,207 | 9/1986 | Fergason . |
| 5,108,172 | 4/1992 | Flasck . |
| 5,626,409 * | 5/1997 | Nakayama et al. .................... 353/31 |
| 5,791,754 * | 8/1998 | Cipolla et al. ......................... 353/78 |
| 5,870,133 * | 2/1999 | Naiki .................................. 347/247 |
| 5,917,561 * | 6/1999 | Hatanaka ................................ 349/8 |

FOREIGN PATENT DOCUMENTS

| | | |
|---|---|---|
| 5-950 | 1/1989 | (JP) . |
| 3-132787 | 2/1991 | (JP) . |
| 5-80321 | 2/1993 | (JP) . |

OTHER PUBLICATIONS

English Abstract (Patent Abstracts of Japan) corresponding to JP 5–80321.

English Abstract corresponding to JP 3–132787.

* cited by examiner

Primary Examiner—Safet Metjahic
Assistant Examiner—E P LeRoux
(74) Attorney, Agent, or Firm—Morgan & Finnegan LLP (57) ABSTRACT

It is proposed to provide a projection apparatus capable of displaying an image by eliminating or reducing the influence of dust. The projection apparatus for projecting image information on a display surface such as a screen, comprises a dust preventive structure (prevention from attaching a foreign substance) of dusting main apparatus members such as an optical modulation device.

15 Claims, 8 Drawing Sheets

PROJECTION APPARATUS

BACKGROUND OF THE INVENTION

1. Field of the Invention

The present invention relates to a projection apparatus and, more particularly, to a projection liquid crystal projector for enlarging and projecting, on a screen or the like, image information displayed on an optical modulation device such as a color liquid crystal panel.

2. Related Background Art

A variety of conventional color liquid crystal projectors have been proposed as optical modulation devices to display image information on liquid crystal panels and enlarge and project the image information on screens.

Figure 9:
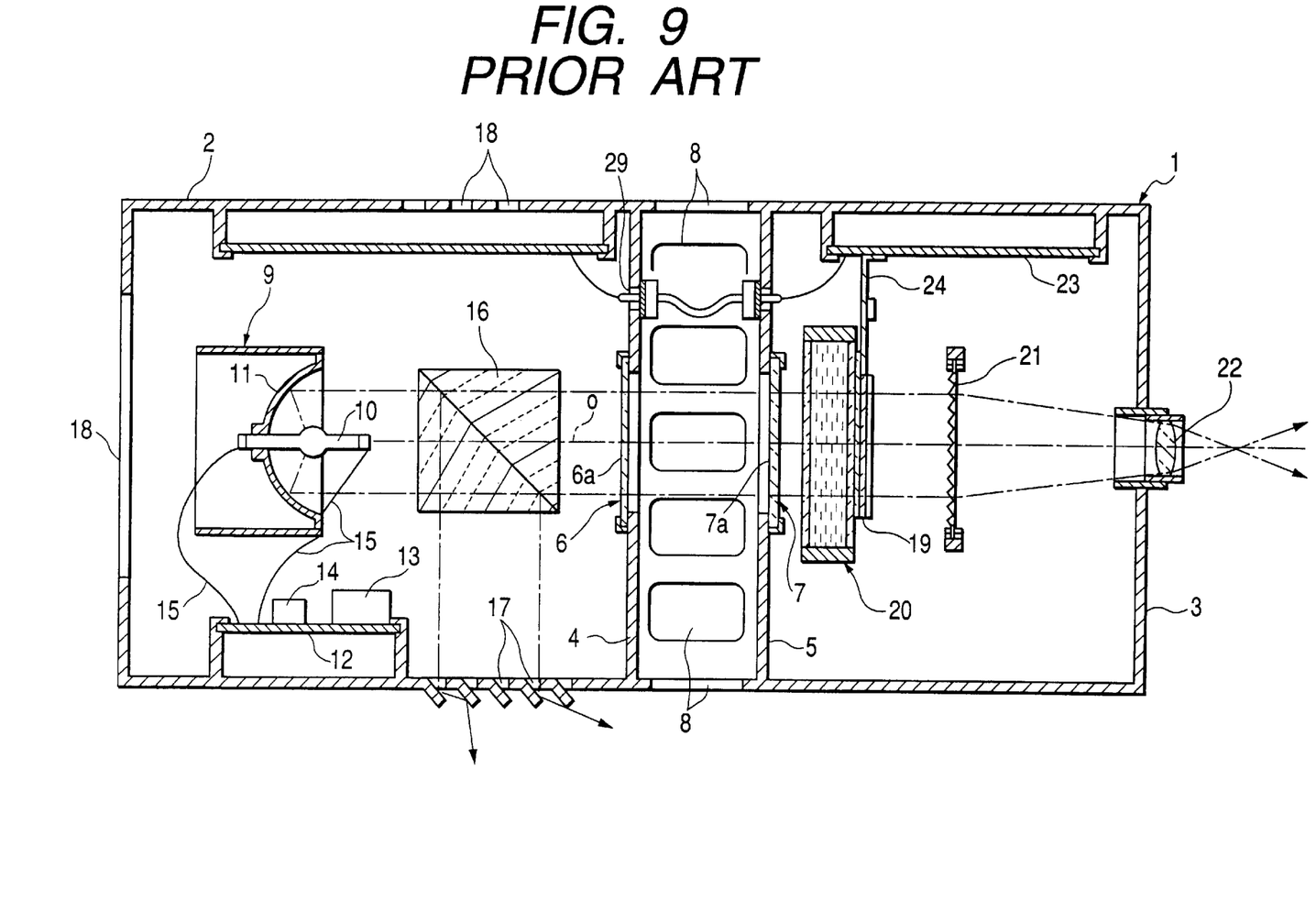
FIG. 9 is a cross-sectional view of a liquid crystal projector using a conventional transmission liquid crystal panel.
Figure 10:
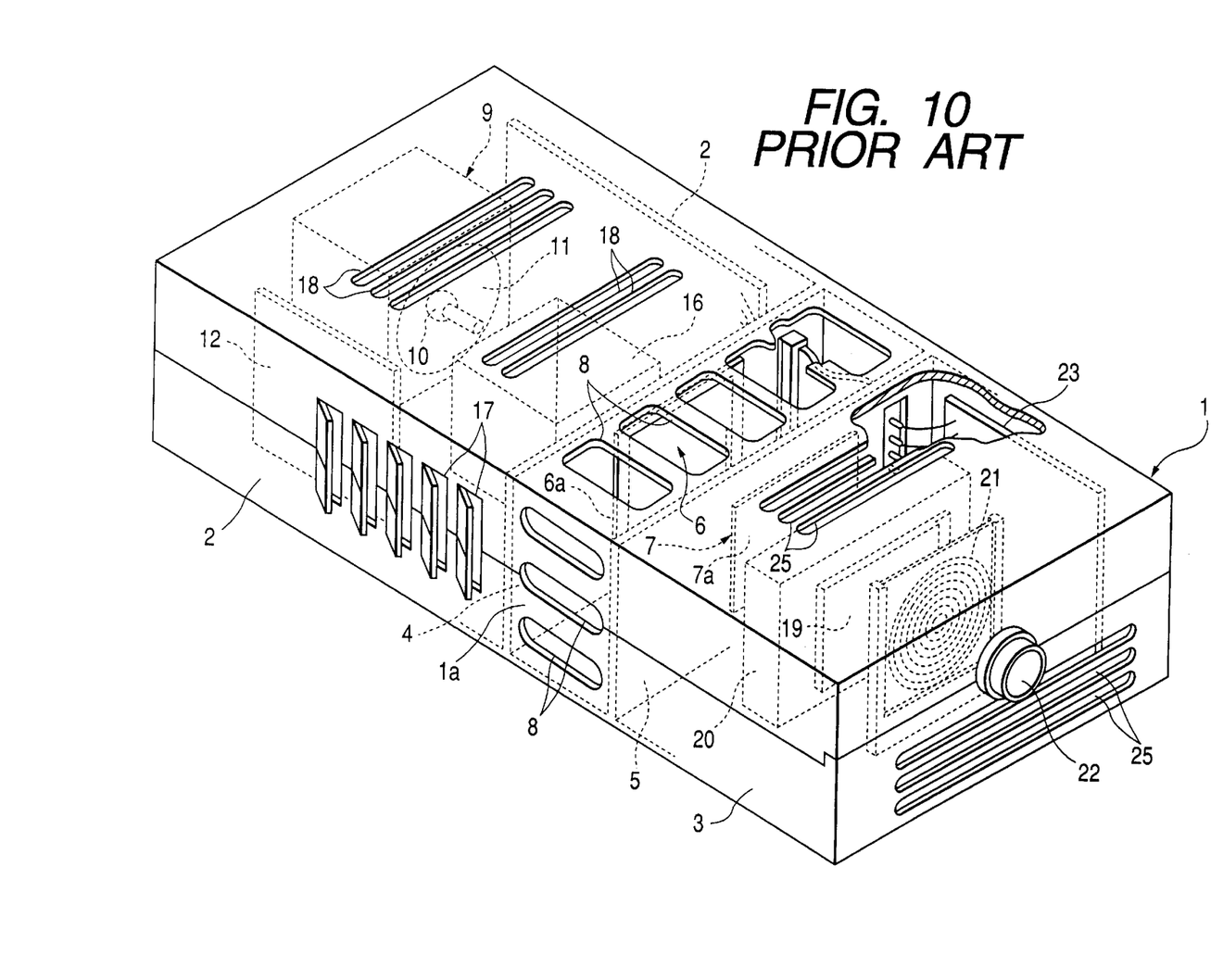
FIG. 10 is a perspective view showing the outer appearance of the projector shown in FIG. 9.

FIGS. 9 and 10 show a projection liquid crystal projector described in Japanese Utility Model Publication No. 5-950.

Referring to FIGS. 9 and 10, a case 1 is divided into two chambers through side walls 4 and 5. A light source 9 is arranged in a rear-side chamber 2, and a liquid crystal display drive unit is arranged in a front-side chamber 3. Openings 6 and 7 are formed at the central portions of the side walls 4 and 5. Transparent plates 6a and 7a made of heat-resistant glass are fitted in the openings 6 and 7. A plurality of vent holes 8 are formed in the outer surface of the case between the side walls 4 and 5.

The light source 9 is located at a position opposing the openings 6 and 7 of the side walls 4 and 5 and comprises a lamp 10 and a reflecting mirror 11. The lamp 10 is connected to a power circuit board 12 having a power transformer 13 and a transformer coil 14 through lead wires 15. A polarizing separation prism 16 is arranged in front of the light source 9 to separate light reflected by the reflecting mirror 11 into S- and P-polarized light components. The P-polarized light component passes through the polarizing separation prism 16 and enters a liquid crystal panel 19 of a liquid crystal display drive unit in the front-side chamber 3. The S-polarized light component is guided to the side surface of the polarizing separation prism 16 and emerges from an exit port 17.

Heat dissipation slits 18 are formed in the upper, lower, and side surfaces of the rear-side chamber 2 containing the light source 9. Heat from the lamp 10 is dissipated through the heat dissipation slits 18 and the exit port 17.

A display panel cooler 20 through which the P-polarized light component pass is located at a position opposing the opening 7 in the front-side chamber 3 which accommodates the liquid crystal display drive unit. The P-polarized light component of the beam from the lamp 10 in the light source 9 passes through the display panel cooler 20 and is incident on the liquid crystal panel 19. The liquid crystal panel 19 is connected to a main circuit board 23 through a panel drive circuit board 24 made of a flexible board. A Fresnel lens 21 is spaced apart from the front surface of the liquid crystal panel 19. A projection lens 22 for projecting the beam focused by the Fresnel lens 21 is hold on the front surface side of the case 1 at a position in front of the Fresnel lens 21. Heat dissipation slits 25 are formed in the front and upper surfaces of the front-side chamber 3 incorporating the above components, as in the rear-side chamber 2.

An open space is formed between the liquid crystal panel 19 and the Fresnel lens 21 in the conventional liquid crystal projector described above. The heat dissipation slits 25 formed in the case 1 prevent dust from entering into the apparatus. Since the drive voltage generates static electricity on the surface of the liquid crystal panel 19 driven by the panel drive circuit board 24, the dust is attracted to the surface of the liquid crystal panel 19. As a result, an image enlarged and projected by the projection lens 22 through the Fresnel lens 21 contains an enlarged image of dust, so a high-quality image cannot be obtained.

The heat dissipation slits 18 are also formed in the rear-side chamber 2 for the light source 9 as in the heat dissipation slits 18, and dust enters through the heat dissipation slits 18. The dust attaches to the reflecting mirror 11, the polarizing separation prism 16, and the like to greatly decrease the brightness of the projector.

SUMMARY OF THE INVENTION

The present invention has been made in consideration of the conventional problems described above, and has as its object to provide a projection apparatus capable of displaying an image by eliminating or reducing the influence of dust.

In order to achieve the above object, there is provided a projection apparatus for projecting image information on a display surface such as a screen, comprising a dust preventive structure (prevention from attaching a foreign substance) of dusting main apparatus members such as an optical modulation device.

According to an aspect of the present invention, there is provided a projection apparatus comprising a display device, a projection optical system for projecting, on a display surface, an image obtained by the display device, and preventive means for preventing a foreign substance from attaching to a surface of the display device.

This projection apparatus is a single-plate monochrome or three-plate full-color image projection apparatus in which the projection optical system comprises a field lens and a projection lens in the order named from the display. device side, and the preventive means comprises sealing means for sealing a space formed between the field lens and the display device.

The present invention discloses the following arrangement. The preventive means comprises the field lens, a lens barrel for holding the field lens, and a seal ring.

The present invention discloses the following arrangements. The display device comprises three liquid crystal panels for forming red, green, and blue images. The projection optical system comprises a projection lens and three field lenses located in front of one of the three liquid crystal panels. The projection lens is one lens system shared by three pairs of liquid crystal panels and field lenses. The preventive means has sealing structures for sealing the spaces between the field lenses and the display device. Each sealing structure comprises the field lens, a lens barrel for holding the field lens, and a seal ring.

The present invention further comprises an illumination optical system for supplying red, green, and blue beams which illuminate the three liquid crystal panels. The illumination optical system comprises a trimming filter for each of red, green, and blue.

The present invention discloses the following arrangement. The trimming filter is located to seal the space between the field lens and itself.

According to another aspect of the present invention, there is provided a projection apparatus in which color separation means color-separates a beam from light source means into a plurality of color beams, lens means focuses the color-separated beams, first deflection means is arranged near-the focal position to irradiate optical modulation devices with the focused beams through field lenses, and second deflection means and a projection optical system project image information based on each optical modulation device to a desired position, wherein dusting structures are respectively arranged between the optical modulation devices corresponding to the plurality of color beams and the field lens opposing the optical modulation devices. Dust can be prevented from attaching to the optical modulation devices, and therefore a high-quality image free from the influence of dust can be projected.

According to still another aspect of the present invention, there is provided a projection apparatus in which color separation means color-separates a beam from light source means into a plurality of color beams, lens means focuses the color-separated beams, first deflection means is arranged near the focal position to irradiate optical modulation devices with the focused beams through field lenses, and second deflection means and a projection optical system project image information based on each optical modulation device to a desired position, wherein the deflection means, the field lenses, and the optical modulation devices are mounted and fixed respectively at predetermined positions in a substantially box-like structure, a light guide opening is formed near the deflection means located at substantially the center of the box-like structure, and the opening is closed with a trimming filter of each color beam to obtain a dusting structure. Even if duct enters from the vent holes due to heat dissipation from the optical modulation devices and light source serving as heat sources, the dust can be prevented from attaching to the optical modulation devices and the like. Therefore, a high-quality image free from the influence of dust can be projected.

The projection apparatus described above may further comprise cooling means having a plurality of vent holes and a fan to cool the interior of the apparatus.

An arrangement for driving, e.g., a scattering type liquid crystal is used as the liquid crystal panel.

DETAILED DESCRIPTION OF THE PREFERRED EMBODIMENT

An embodiment of the present invention will be described with reference to FIGS. 1 to 8.

Figure 6:
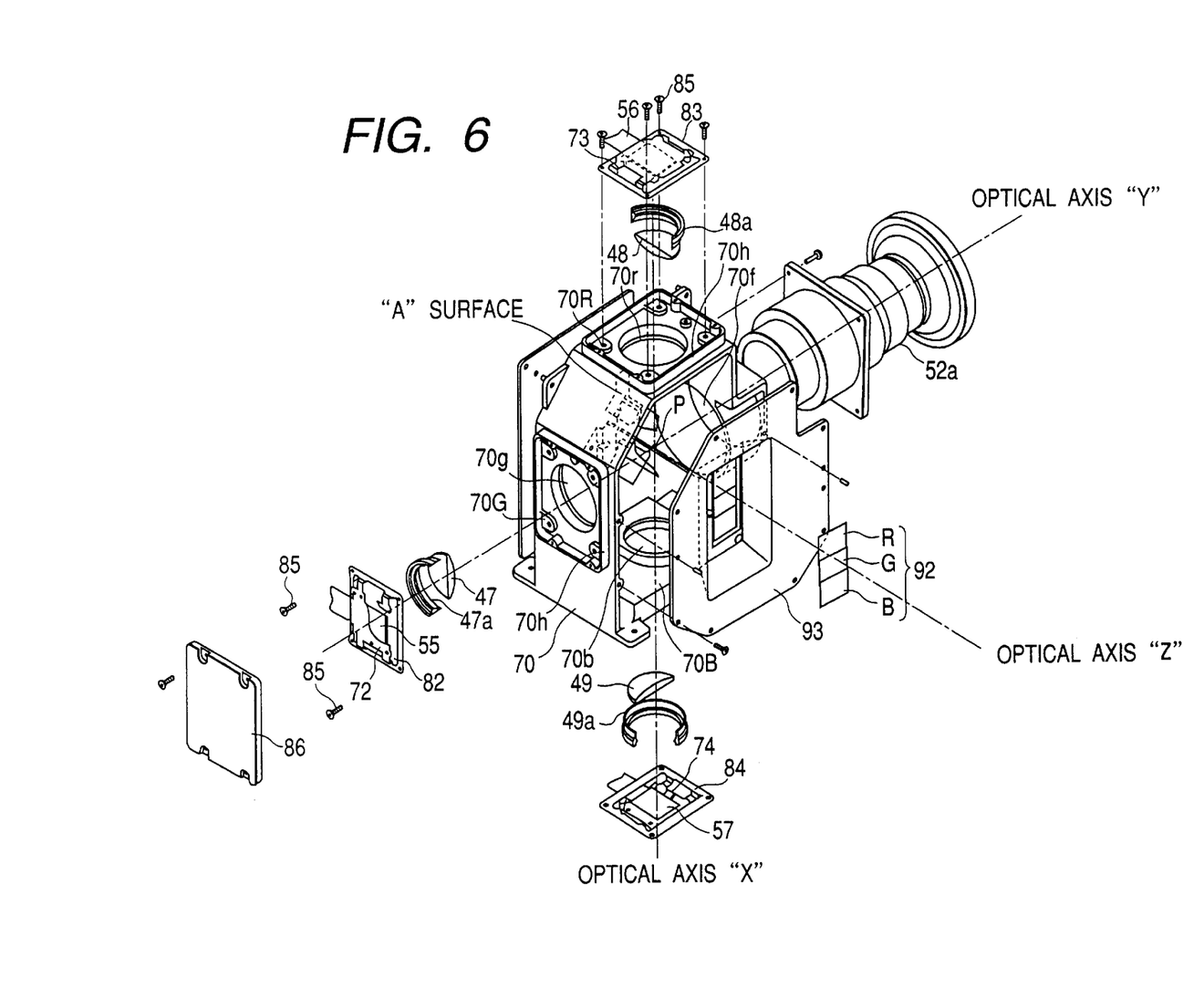
FIG. 6 is an exploded perspective view showing the structure of the main optical system.
Figure 7:
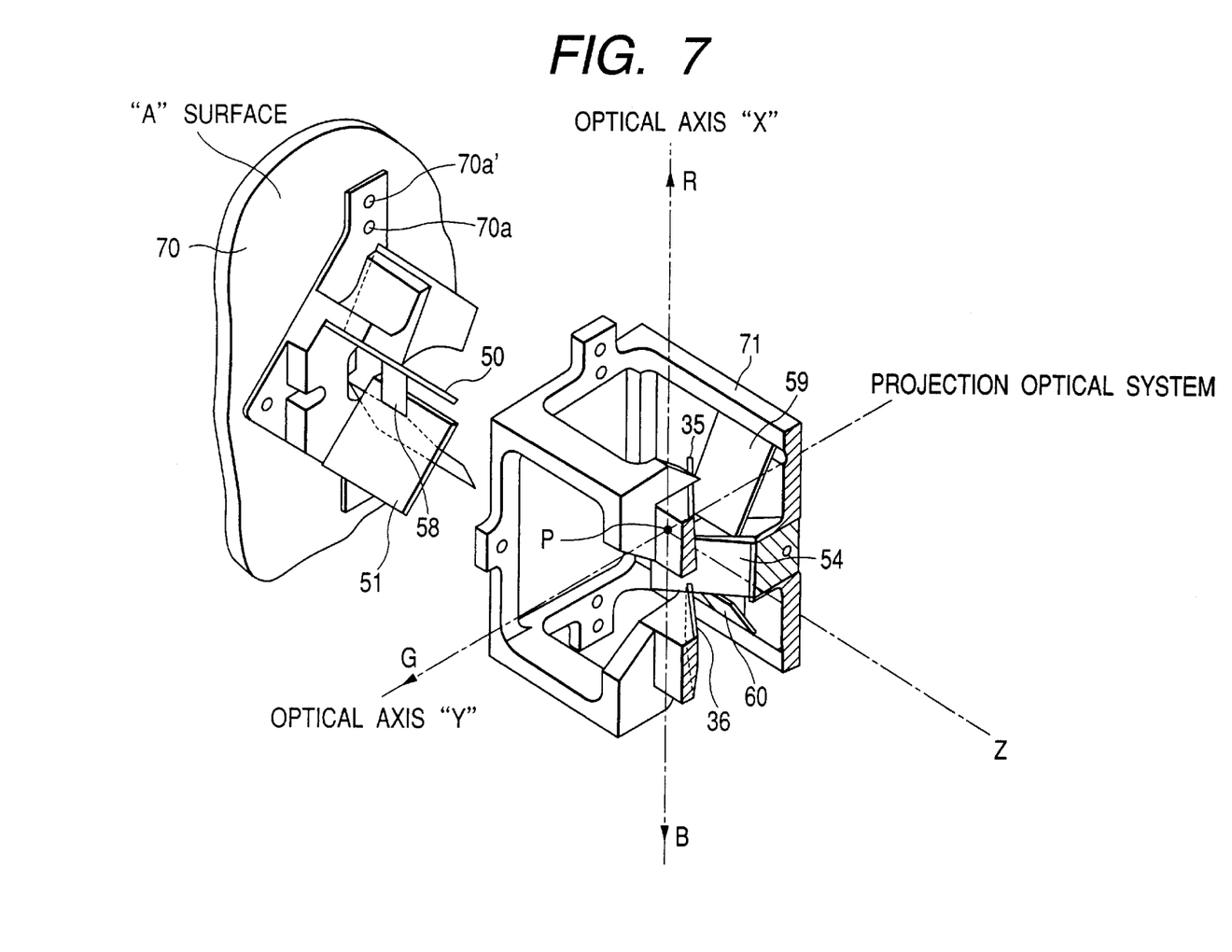
FIG. 7 is a perspective view of the main part of the main optical system.
Figure 8:
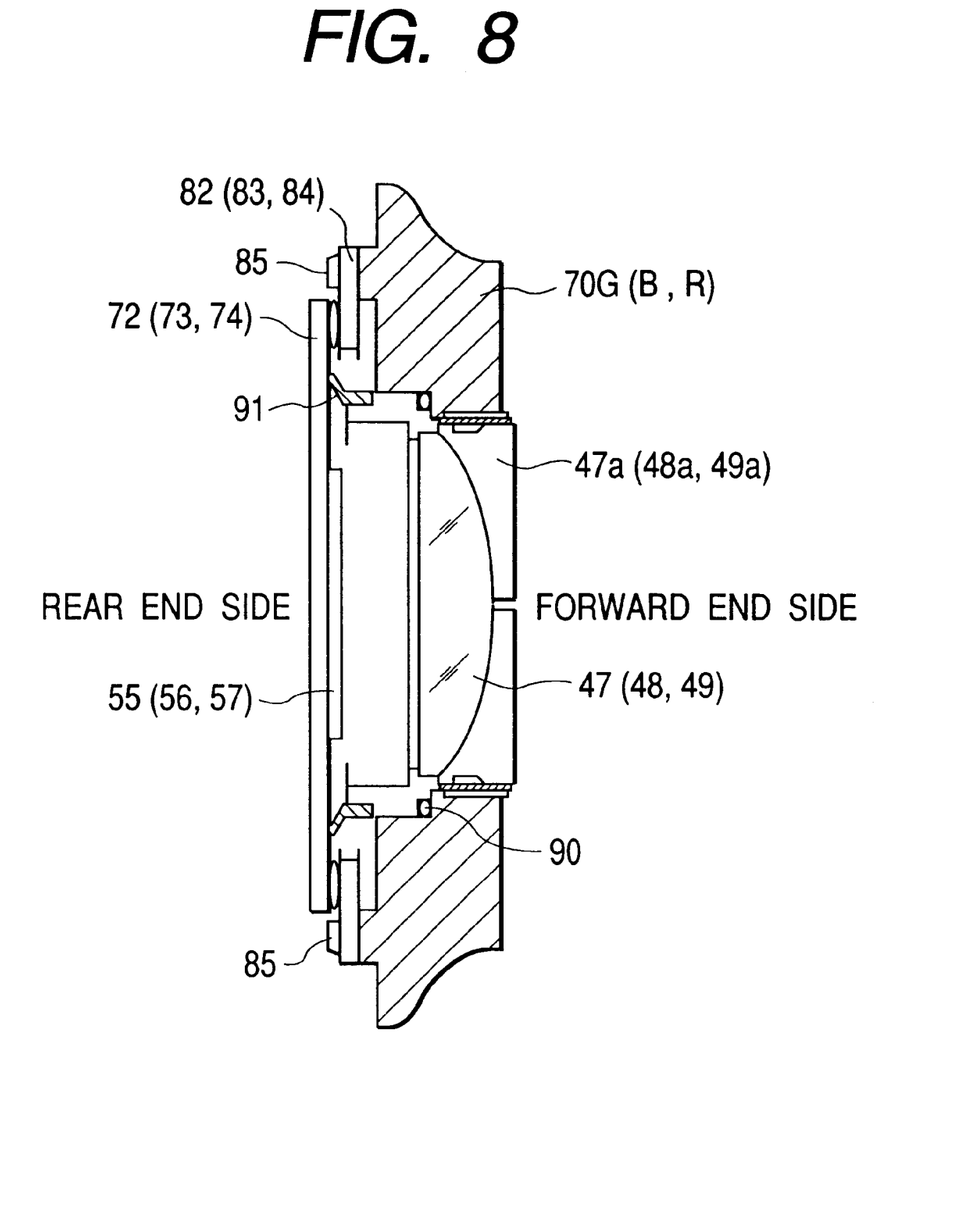
FIG. 8 is a perspective view of the main part of the main optical system.

FIGS. 1 to 5 show the schematic modes of an optical system of a color liquid crystal projector using a liquid crystal panel according to an embodiment. FIG. 6 is an exploded perspective view of this optical system, FIG. 7 is a perspective view of the main part when this optical system is assembled in a lens barrel, and FIG. 8 is a sectional view of the main part shown in FIG. 7. The projector of this embodiment has a plurality of vent holes in a case (not shown) as in the conventional case, and the interior of the case is cooled by a cooling fan.

Figure 1:
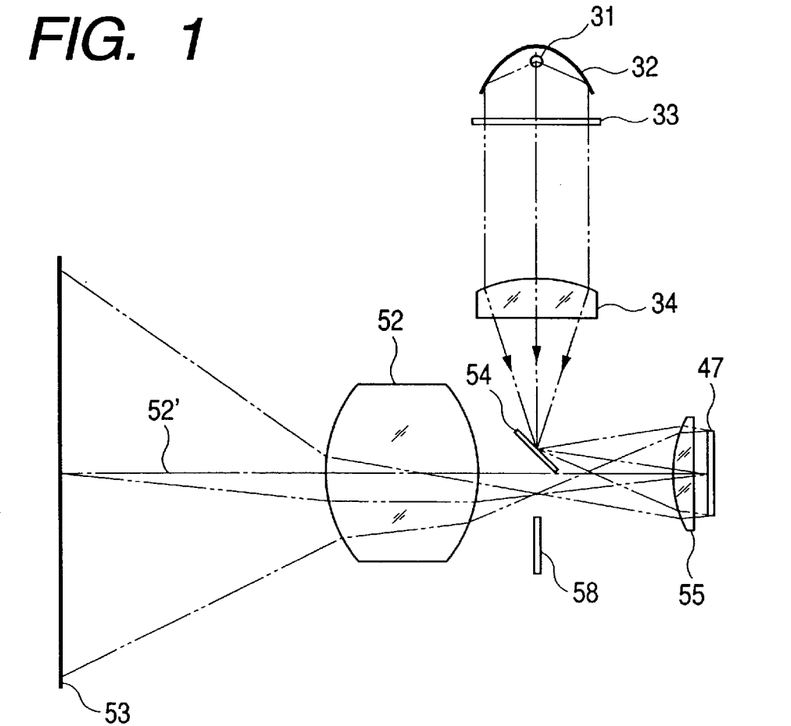
FIG. 1 is a view showing the schematic optical mode of an optical system of a color liquid crystal projector using a liquid crystal panel according to an embodiment of the present invention.
Figure 2:
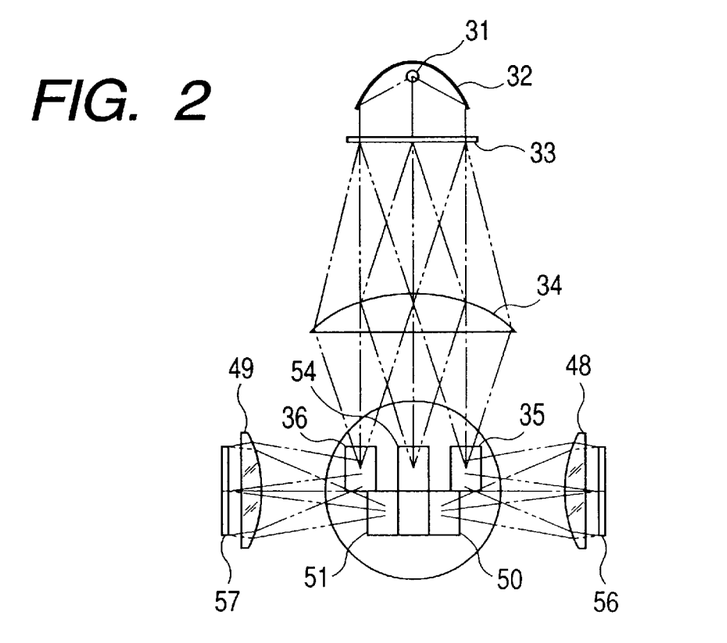
FIG. 2 is a view showing the schematic optical mode for explaining a main optical system.

Referring to FIGS. 1 and 2, white light emitted by a light source (light source means) 31 is collimated into almost parallel light by a reflecting mirror (parabolic mirror) 32 and separated by a transmission diffraction grating (color separation means) 33 into three beams (color beams) corresponding to the wavelength ranges of red light (R), green light (G), and blue light (B). The transmission diffraction grating 33 is located in almost the parallel light obtained by the reflecting mirror 32 to prevent color and brightness irregularities in illuminating the liquid crystal panel.

The color beams (R, G, and B beams) from the transmission diffraction grating 33 are incident on a condenser lens (lens means) 34 at different angles within the plane perpendicular to the drawing surface of FIG. 1 and focused by the condenser lens 34 to form light source images near mirrors 54, 35, and 36 inclined with each other and spaced apart from each other near a stop 58 of a projection optical system 52.

The G beam is present on the section of FIG. 1. The G beam is reflected by the mirror 54 and collimated to an almost parallel beam by a field lens 47. The G beam illuminates a reflection liquid crystal panel 55 obliquely downward with respect to the above section. The beam modulated with image information from the reflection liquid crystal panel 55 is reflected obliquely upward with respect to the above section. The field lens 47 focuses the reflected beam so as to form a light source (image) again between mirrors 50 and 51 located near the stop 58 of the projection optical system 52.

Figure 3:
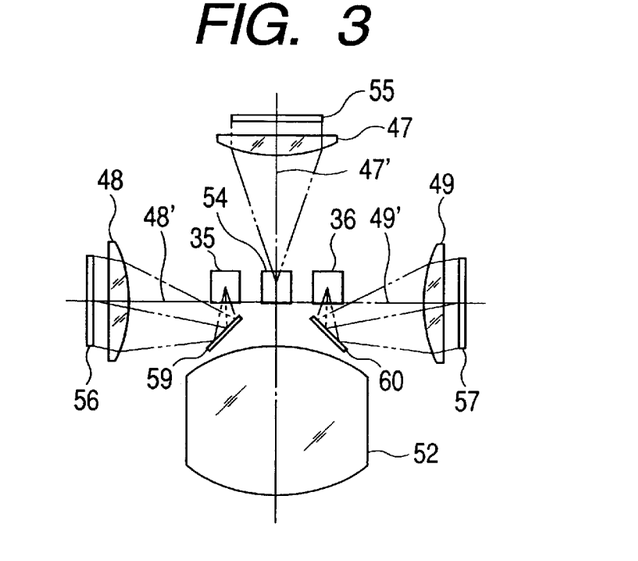
FIG. 3 is a view for explaining the main optical system.
Figure 4:
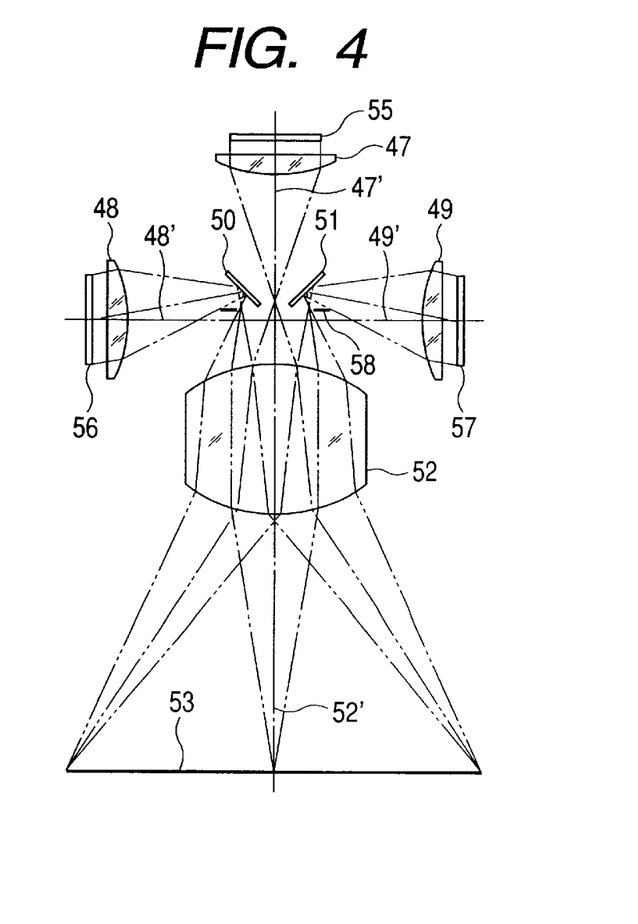
FIG. 4 is a view for explaining a state of projection by the main optical system.

The R and B beams will be described with reference to FIGS. 2 to 4.

The R beam is sequentially reflected by the mirror 35 and a mirror 59 and collimated to an almost parallel beam by a field lens 48. This parallel beam illuminates a reflection liquid crystal panel 56. The liquid crystal illumination direction is obliquely downward with respect to the section in FIG. 2 as in the G beam and obliquely upward with respect to the section in FIG. 3.

The beam modulated with the image information by the reflection liquid crystal panel 56 is reflected by the reflection liquid crystal panel 56 in a direction opposite to the incident illumination direction. The field lens 48 focuses the reflected light so as to form a light source (image) again on the mirror 50 located near the stop 58 of the projection optical system 52.

Similarly, the B beam is sequentially reflected by the mirror 36 and a mirror 60 and collimated to an almost parallel beam by a field lens 49. This parallel beam illuminates a reflection liquid crystal panel 57. The liquid crystal illumination direction is obliquely downward with respect to the section in FIG. 2 as in the G beam and obliquely upward with respect to the section in FIG. 3.

The beam modulated with the image information by the reflection liquid crystal panel 57 is reflected by the reflection liquid crystal panel 57 in a direction opposite to the incident illumination direction. The field lens 49 focuses the reflected light so as to form a light source (image) again on the mirror 51 located near the stop 58 of the projection optical system 52.

The G beam passes between the mirrors 50 and 51, while the R and B beams are respectively reflected by the mirrors 50 and 51. These three beams are incident on the projection optical system 52. The projection optical system 52 superposes the pieces of image information of the respective colors from the liquid crystal panels 55, 56, and 57 on a screen 53 and forms a full-color image on the screen 53.

The field lenses 48 and 49 respectively have common optical axes 48' and 49' perpendicular to an optical axis 47' of the field lens 47. When the field lens 48 and the reflection liquid crystal panel 56 are folded with respect to the mirror 50, they overlap the field lens 47 and the reflection liquid crystal panel 55, respectively. Similarly, when the field lens 49 and the reflection liquid crystal panel 57 are folded with respect to the mirror 51, they respectively overlap the field lens 47 and the reflection liquid crystal panel 55, respectively. That is, the respective liquid crystal panels are located at optically identical positions with respect to the projection optical system 52. For this reason, the beams from the liquid crystal panels 55, 56, and 57 pass through the different portions of the aperture of the stop 58 of the projection optical system 52 to project enlarged images of the corresponding colors at the same position on the screen, thereby forming a full-color image. To satisfy this relationship, the liquid crystal panels 55, 56, and 57 are located on the optical axes of the corresponding field lenses 47, 48, and 49. The liquid crystal panels 56 and 57 are illuminated with the light beams inclined with respect to the optical axes on the sections shown in FIGS. 3 and 8. The light source images of R, G, and B beams respectively focused by the field lenses 47, 48, and 49 are set to have sizes to fall within the aperture of the stop 58 of the projection optical system 52. The field lenses are arranged to efficiently use the light beams. The liquid crystal panels 55, 56, and 57 drive a scattering type liquid crystal and are disclosed in U.S. Pat. No. 4,613,207.

The mirrors 35, 36, 54, 59, and 60 constitute elements of the first deflection means (mirror means), and the mirrors 50 and 51 constitute the elements of the second deflection means.

Since the white light beam is incident almost vertically on the transmission diffraction grating 33 serving as a transmission color separation device, a diffraction angle of the ±1st-order diffracted beams with respect to the 0th-order diffracted beam is given by equation (1) as follows:

$$\sin\theta = \lambda/p \tag{1}$$

where p is the patch of the step grating, and λ is the peak wavelength of diffracted light from the step grating.

Since the R beam as the +1st-order diffracted beam is asymmetrical about the B beam as the −1st-order diffracted beam, the inclinations of the mirrors 59 and 60 may be set so as to illuminate the liquid crystal panels 56 and 57 at equal tilt angles.

Figure 5:
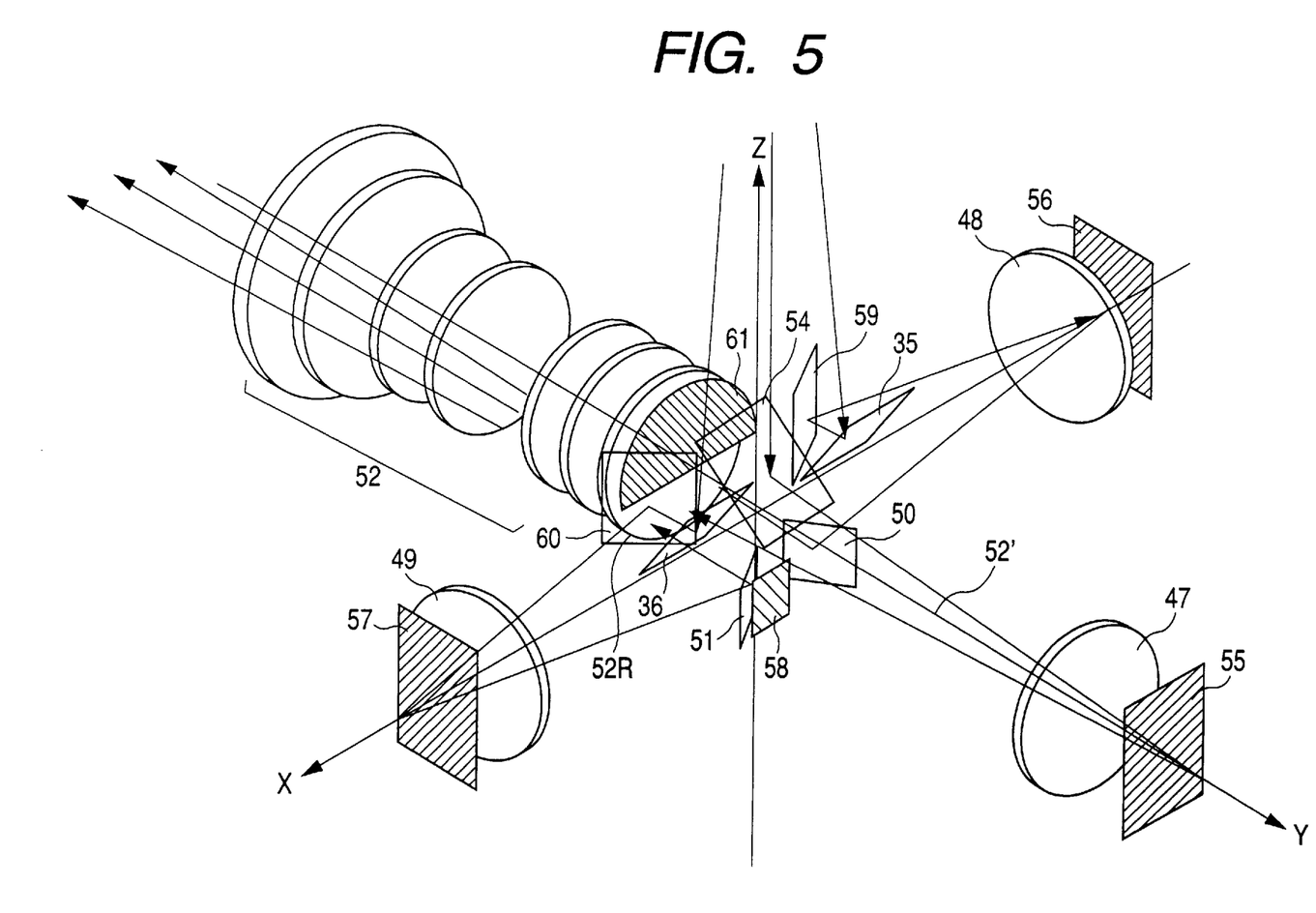
FIG. 5 is a perspective view showing the state of projection by the main optical system.

FIG. 5 stereoscopically shows the mirrors 54, 35, 36, 59, and 60 arranged in the color separation illumination optical system and the mirrors 50 and 51 arranged in the color synthesis optical system.

The positional relationship between the mirror positions can be readily understood from FIG. 5. Optical components from the light source 31 to the condenser lens 34 are not illustrated in FIG. 5.

A light-shielding plate 61 located at the upper half of a rear element 52R of the projection optical system 52 prevents stray light from the color separation illumination optical system from directly entering into the projection optical system 52. This light-shielding plate 61 allows to obtain a high-contrast projection image free from stray light.

The mirrors 35, 36, 54, 59, and 60 constituting the first deflection means and the mirrors 50 and 51 constituting the second deflection means are respectively located in areas obtained by dividing the aperture (see FIGS. 1 and 4) of the stop 58 of the projection optical system 52 two separate areas including an optical axis 52'.

Note that the color separation optical system and the color synthesis optical system are preferably arranged to pass the G beam at the central portion of the aperture of the stop 58 of the projection optical system 52 and the B and R beams at the peripheral portions of the aperture of the stop 58. With this arrangement, a projection image having a high resolution can be obtained.

A structure in which the above-mentioned plurality of optical components constituting the above optical systems are assembled will be described with reference to FIGS. 6 to 8.

Referring to FIG. 6, an optical housing 70 for accommodating the optical components (plurality) is formed into an almost box-like shape and has a side wall 70G formed along the optical axis "X" and side walls 70R and 70B formed along the optical axis "Y". The side walls 70R and 70B are perpendicular to the side wall 70G. Openings 70r, 70g, and 70b are respectively formed in the side walls 70R, 70G, and 70B to transmit the light beams centered on their optical axes. A mirror holding frame 71 which holds the mirrors 35, 36, 54, 59, and 60 constituting the first deflection means described with reference to the optical systems shown in FIGS. 1 to 5 is located at almost the central portion of the optical housing 70 and supported and fixed in the optical housing 70. The optical axis "Y" corresponds to the optical axis 52' in FIGS. 1 to 5.

As shown in FIG. 7, the reflecting mirrors 35 and 36, the reflecting mirrors 36 and 60, and the reflecting mirror 54 are fixed in the mirror holding frame 71 at desired tilt angles.

The mirror holding frame 71 has a shape open along the optical axes "X" and "Y" in FIG. 6 so as to prevent an eclipse on the optical paths of the R, G, and B color beams described above.

Near the stop 58 of the projection optical system 52, the synthesis mirrors 50 and 51 constituting the second deflection means are supported and fixed on an almost inverted V-shaped Z-direction wall perpendicular to the "A" surface serving as the inner surface of the optical housing 70. The synthesis mirrors 50 and 51 are spaced apart from each other by a desired distance near the stop 58.

As shown in FIG. 7, an engaging hole 70a for positioning the mirror holding frame 71 and a mounting screw hole 70a' are formed in the "A" surface. The mirror holding frame 71 is positioned by fitting its projecting pin in the engaging hole 70a, and a screw is threadably engaged with the mounting screw hole 70a', thereby fixing and supporting the mirror holding frame 71 on the optical housing 70.

The optical housing 70 has the other open end face so as to insert and arrange the synthesis mirrors 50 and 51 in the mirror holding frame 71. Therefore, the first and second deflection means are located near the stop 58 of the projection optical system 52 described above.

As shown in FIG. 6, in the optical housing 70, a lens barrel 49a which supports the field lens 49 is engaged with the opening 70b at a desired position in one direction along the optical axis "X" from an intersection P between the optical axes "X" and "Y" and is movable along the optical axis "X". Similarly, a lens barrel 48a which supports the field lens 48 is engaged with the opening 70r at a desired position in the other direction along the optical axis "X" and is movable along the optical axis "X".

The opening 70g is formed at a desired position in one direction along the optical axis "Y" from the intersection P in the optical housing as in the optical axis "X". A lens barrel 47a having the field lens 47 is engaged and held in the opening 70g. An opening 70f for supporting and fixing a lens barrel 52a for the projection optical system 52 along the optical axis "Y" is formed at a desired position in the other direction along the optical axis "Y". The lens barrel 52a is held movable along the optical axis "Y". Although not shown in this embodiment, the lens barrel 52a is held and fixed to be movable by threadable engagement or a helicoid.

The R, G, and B color beams are focused on the corresponding liquid crystal panels 55, 56, and 57 by the field lenses 47, 48, and 49. A system associated with the G beam is taken as an example. An almost rectangular holding plate 72 integrally formed with the liquid crystal panel 55, and an almost rectangular support plate 82 made of a heat conductive material almost identical to the holding plate 72 are fixed with positioning screws 85 at at least two threaded portions with positioning holes formed in the projections on the side wall 70G of the optical housing 70. In the embodiment shown in FIG. 6, the holding plate 72 of the liquid crystal panel 55 is located on the support plate 82 at an optically appropriate position by an external adjusting unit (not shown) and fixed at this position with a bonding material such as solder or adhesive resin. The external adjusting unit can perform rotation (θ) and movement ("aori" in Japanese) with respect to the optical axes "X", "Y", and "Z". For a system associated with the R beam, a holding plate 73 with the reflection liquid crystal panel 56 is located at a desired position so as to register the reflection liquid crystal panel 56 fixed in the optical housing 70, and the holding plate 73 is fixed.

For the B beam, a holding plate 74 with the reflection liquid crystal panel 57 is located at a desired position so as to register the reflection liquid crystal panel 57 in the same manner as described above, and the holding plate 74 is fixed to a support plate 84.

Almost rectangular dust covers 86 are disposed on the R, G, and B liquid crystal panels from the outer side (rear side) of the fixed liquid crystal panels 55, 56, and 57.

Outer walls 70h are formed on the edges of the side walls 70R, 70G, and 70B of the optical housing 70, respectively, as shown in FIG. 6. The outer walls 70h are engaged with the dust covers 86 and are fixed to each other with screws. Although the inner sides of the dust covers 86 are not illustrated, openings are formed in the dust covers 86 to partially expose the. flexible drive circuit boards of the liquid crystal panels 55, 56, and 57 outside. An elastic member seals the edge of each opening to prevent external dust from entering into the housing in extracting the corresponding flexible drive circuit board.

In the embodiment having the above structure, dust can be prevented from entering into the liquid crystal panels 55, 56, and 57 between the dust covers 86 and the lens barrels 47a, 48a, 49a of the field lenses 47, 48, and 49.

The sealing structure of the optical housing 70 will be described in detail with reference to FIG. 8. FIG. 8 shows the mounting structure of the lens barrels 47a, 48a, and 49a accommodating the field lenses 47, 48, and 49, the liquid crystal panels 55, 56, and 57, and their holding plates 72, 73, and 74, and support plates 82, 83, and 84, all of which are disposed on the side walls 70R, 70G, and 70B of the optical housing 70.

Common parts can be used for R, G, and B, and an example will be described below. A lead screw to engage with the threaded portion of the opening 70g of the optical housing 70 is formed on the outer surface of the forward end side of the lens barrel 47a of the field lens 47. A seal ring 90 is disposed at the stepped portion at almost the center between the forward end side and the rear end side. The peripheral portion of the seal ring 90 and the edge portion of the opening 70g on the optical housing 70 side achieve excellent sealing.

A seal member 91 made of a funnel-like elastic member is disposed on the outer surface of the rear end side of the lens barrel 47a. The seal member 91 is in contact with the holding plate 72 of the liquid crystal panel 55. The elastic force of the funnel-like portion is used to achieve contact with a sufficient adjustment margin in the optical axis in the above-mentioned positioning. Therefore, the liquid crystal panel 55 can be kept sealed by the seal members 90 and 91.

In positioning, an external adjusting unit is used to position the G liquid crystal panel in the same manner as described above. The R and B liquid crystal panels are positioned in the same manner as the G liquid crystal panel. These liquid crystal panels are fixed with a bonding member (solder or resin adhesive). The support plate 82 and holding plate 72, the support plate 83 and holding plate 73, and the support plate 84 and holding plate 74 are disposed to obtain a desired gap in the optical axis in bonding.

In this embodiment, the external adjusting unit is used as a positioning means for the liquid crystal panels 55, 56, and 57. However, the liquid crystal panels may be fixed on a general X-Y-Z-θ stage, and the stage with the liquid panels may be supported and fixed in the optical housing 70.

In this embodiment, the spaces around the display surfaces of the liquid crystal panels 55, 56, and 57 are closed to obtain a dusting structure. At the same time, the opening in the Z-direction side surface of the optical housing 70 is covered from the Z direction (see FIG. 6) of the box-like optical housing 70 with a trimming filter mounting plate 93 formed to dispose a trimming filter 92 (R, G, and B) corresponding to the R, G, and B color beams near the Z-direction upper surfaces of the mirrors of the mirror holding frame 71. Almost the central portion of the mounting plate 93 projects toward the mirror holding frame 71. The mounting plate 93 has a trimming filter opening and a bonding margin at almost its center. The trimming filter 92 (R, G, and B) is adhered to the opening, thereby preventing dust from entering into the housing.

In the embodiment having the above structure, the main optical members in the integral optical housing 70 are covered with the trimming filter 92 and its mounting plate 93. At the same time, the liquid crystal panels 55, 56, and 57 are kept sealed by the funnel-like seal members 91 provided in the lens barrels 47a, 48a, and 49a contacting with the holding plates 72, 73, and 74 for the liquid crystal panels 55, 56, and 57, and by the seal rings 90 engaged with the openings 80g, 70b, and 70r of the optical housing 70 together with the lens barrels 47a, 48a, and 49a, thereby preventing dust from attaching the surfaces of liquid crystal panels 55, 56, and 57.

In the projection apparatus of the above embodiment, there is provided a projection apparatus in which color separation means color-separates a beam from light source means into a plurality of color beams, lens means focuses the color-separated beams, first deflection means is arranged near the focal position to irradiate optical modulation devices with the focused beams through field lenses, and second deflection means and a projection optical system project image information based on each optical modulation device to a desired position, wherein dusting structures are respectively arranged between the optical modulation devices corresponding to the plurality of color beams and the field lens opposing the optical modulation devices, or there is provided a projection apparatus in which color separation means color-separates a beam from light source means into a plurality of color beams, lens means focuses the color-separated beams, first deflection means is arranged near the focal position to irradiate optical modulation devices with the focused beams through field lenses, and second deflection means and a projection optical system project image information based on each optical modulation device to a desired position, wherein the deflection means, the field lenses, and the optical modulation devices are mounted and fixed respectively at predetermined positions in a substantially box-like structure, a light guide opening is formed near the deflection means located at substantially the center of the box-like structure, and the opening is closed with a trimming filter of each color beam to obtain a dusting structure. A cooling fan can cool a light source and an optical modulation device or drive power source serving as a heat source with wind (air) without considering the influence of dust. Vent holes communicating with the outer air can be formed at desired positions, thereby facilitating the arbitrary apparatus layout and obtaining a high-quality image free from the influence of dust.

Since the main optical members are accommodated in a sealing structure, the optical modulation device or the like serving as a main optical member can be disconnected from a light source means and mounted on a dedicated positioning adjusting illumination unit, thereby improving productivity.

What is claimed is:

1. A projection type display apparatus comprising:
   a display device;
   a projection optical system for projecting, on a plane, an image obtained by said display device, said projection optical system having a plurality of lenses; and
   sealing means for substantially sealing only a space between said display device and a lens of the plurality of lenses, disposed closest to said display device.

2. A projection type display apparatus according to claim 1, wherein
   said projection optical system comprises a field lens and a projection lens, in the order named from said display device side, and said field lens is said lens closest to said display device.

3. A projection type display apparatus according to claim 2, wherein said sealing means comprises said field lens, a lens barrel for holding said field lens, and a seal ring.

4. A projection type display apparatus according to claim 1, wherein
   said display device comprises three liquid crystal panels for forming red, green, and blue images,
   said projection optical system comprises a projection lens and three field lenses each of which is located in front of one of said three liquid crystal panels, said projection lens being a common lens system shared by three pairs of liquid crystal panels and field lenses.

5. An apparatus according to claim 4, wherein said sealing means has three seal rings for sealing spaces between said field lenses and said liquid crystal panels.

6. A projection type display apparatus according to claim 5, wherein said three liquid crystal panels are reflection type panels, said projection type display apparatus further comprises
   an illumination optical system for supplying red, green, and blue beams which illuminate said three liquid crystal panels, said illumination optical system comprises a trimming filter for each of red, green, and blue, said trimming filters are located to seal a space between said field lenses and said trimming filters.

7. A projection type display apparatus according to claim 1, further comprising cooling means having a plurality of vent holes formed in a case of said apparatus to cool an interior of said apparatus.

8. A projection type display apparatus according to claim 2, further comprising cooling means having a plurality of vent holes to cool an interior of said apparatus.

9. A projection type display apparatus according to claim 3, further comprising cooling means having a plurality of vent holes to cool an interior of said apparatus.

10. A projection type display apparatus according to claim 4, further comprising cooling means having a plurality of vent holes to cool an interior of said apparatus.

11. A projection type display apparatus according to claim 5, further comprising cooling means having a plurality of vent holes to cool an interior of said apparatus.

12. A projection type display apparatus according to claim 6, further comprising cooling means having a plurality of vent holes to cool an interior of said apparatus.

13. A projection display apparatus according to claim 1, wherein said display device is a reflection type liquid crystal panel.

14. A projection display apparatus according to claim 13, wherein said display device comprises a scattering type liquid crystal.

15. A projection display apparatus according to claim 13, wherein said display device is a scattering type liquid crystal panel.

* * * * *